United States Patent [19]
Moench

[11] 3,894,137
[45] July 8, 1975

[54] METHOD OF DOMING PLANAR SHEETS
[75] Inventor: Theodor Peter Moench, Darmstadt, Germany
[73] Assignee: Rohm GmbH, Darmstadt, Germany
[22] Filed: Oct. 17, 1972
[21] Appl. No.: 298,458

[30] Foreign Application Priority Data
Oct. 27, 1971 Germany.......................... 2153442

[52] U.S. Cl. ................. 264/230; 156/87; 156/224; 264/248; 264/342 R; 264/DIG. 71
[51] Int. Cl. ....................... B29c 25/00; B29c 27/02
[58] Field of Search......... 264/230, 342 R, DIG. 71, 264/234, 237, 348, 345, 248; 156/87, 224

[56] References Cited
UNITED STATES PATENTS

| | | | |
|---|---|---|---|
| 1,762,539 | 6/1930 | Adams................................. | 156/87 |
| 3,000,057 | 9/1961 | Swedlow et al..................... | 264/230 |
| 3,093,526 | 6/1963 | Price et al........................... | 264/230 |
| 3,140,325 | 7/1964 | Graff.................................. | 156/224 |
| 3,262,451 | 7/1966 | Morse............................. | 264/342 R |
| 3,318,748 | 5/1967 | Hurst................................... | 156/224 |
| 3,413,750 | 12/1968 | Henry............................. | 264/342 R |
| 3,674,109 | 7/1972 | Murase................................ | 156/87 |
| R25,202 | 7/1962 | Clapp et al. ................. | 264/DIG. 71 |

FOREIGN PATENTS OR APPLICATIONS
640,357   4/1962   Canada............................. 264/230

Primary Examiner—Robert F. White
Assistant Examiner—James B. Lowe
Attorney, Agent, or Firm—Curtis, Morris & Safford

[57] ABSTRACT

A method for cold-forming a sheet of stretched or unstretched thermoplastic synthetic resin to form a domed body by tightly clamping said sheet in edge portions, heating only the clamped portions above the freezing point of the resin, cooling the heated clamped portions slightly below the freezing point of the resin, releasing the clamping, and further cooling the edges to room temperature. Single-wall and double-wall domes useful as structural elements, e.g. skylights, can be formed by this method.

10 Claims, No Drawings

METHOD OF DOMING PLANAR SHEETS

The present invention relates to a method for cold-forming planar sheets of thermoplastic synthetic resins to form domed bodies.

It is known in the art to shape thermoplastic synthetic resins by warming them above their freezing temperature (softening point), putting them into the desired form — for example by shaping them with compressed air or a vacuum or by means of a male die and female mold —, and then maintaining them in the desired form until they cool and solidify. (By the "freezing temperature" or "glass transformation temperature" of a synthetic resin is to be understood that temperature at which the coefficient of expansion undergoes a discontinuous change.)

In particular cases, synthetic resins of the aforementioned type are also formed at room temperature, for example by exerting high pressure on a sheet or plate which is tightly held in its edge portions. The deformation which results is also characterized as cold creep. If the forming is carried out at a temperature closely below the softening point, the process is known as relaxation forming. In comparison with forming processes in which the starting material is warmed above its softening point, these last-mentioned processes play only a minor role.

An object of the present invention is the cold-forming of planar sheets of those synthetic resins which, on warming, are transformed into a thermoplastic condition. In the method of the invention, forming takes place under the influence of those forces which are released on the cooling of heated edge portions of the sheets or by the cooling of a heated zone in the interior area of a sheet. During the forming process, that portion of the sheet which is to become deformed is planar at room temperature. A practical utilization of the forces which are released on cooling a partially heated (i.e a zonally heated) planar structure to deform such a planar structure into a curvilinear, e.g. spherical or cylindrical, body has not heretofore been known in the art.

The process of the invention can be described by reference to a simple embodiment given by way of illustration. A rectangular sheet of acrylic glass (polymethyl methacrylate) 500 × 500 × 3 mm was tightly clamped between double metal frames in an edge portion or edge zone of 10 millimeters and then heated in this edge portion to a temperature of 120°–160°C., i.e. to a temperature above the freezing point of the resin. Heating of the clamped edges can be effected in any convenient fashion, for example with hot air, steam, an electrical resistance heater, or with the use of a high-frequency or ultrasonic field. Because of the poor heat conductivity of the synthetic resins which are treated according to the invention, heating is sharply limited therein to the region of the heated contact surfaces. The pressure exerted on the sheet in the edge portion must be sufficiently high that a change in the dimensions of the resin material due to temperature changes is hindered. This pressure is about 10 kg/cm², for example. While the synthetic resin is fixed under this pressure, the edge portions are then cooled closely below the freezing temperature, advantageously to 100°C. in the present example, and then the pressure on the edges is released. At this point, the 500 × 500 mm sheet has a temperature of 100°C. in the outer or circumferential edge portions and has a temperature of, for example 20°C. (room temperature) in the remaining surface portions. As the edge portions cool to room temperature, either by themselves or with supplemental cooling, that part of the sheet which was not heated and which was not submitted to any pressure, i.e. that portion of the sheet which is 480 × 480 mm in area, arches up spherically to such a degree that the zenith of the deformed sheet has an elevation of about 25 mm.

The comparative degree of arching of resin sheets of comparable dimensions depends on the nature of the synthetic resin, or more precisely, on its modulus of elasticity, and on the position of the freezing temperature relative to room temperature. Thus, for example, the freezing temperature of a polycarbonate resin is higher than that of polymethyl methacrylate. Thus, at the moment of release of the edge pressure, the temperature difference between the heated edge portions and the cool principal portion of a polycarbonate sheet can be about 25°C. greater than it can in an acrylic glass. As a result of such a higher temperature difference, there is a stronger degree of arching or doming of the polycarbonate sheet.

The degree of doming is also dependent on the thickness of the material being formed such that, under otherwise comparable conditions and for sheets of comparable dimensions, a thicker sheet undergoes a smaller degree of doming than does a thinner sheet. This phenomenon can be used for the preparation of unsymmetrically domed double-walled elements, for example.

As examples of thermoplastic synthetic resins which can be formed according to the new process, polyacrylates and polymethacrylates; polystyrene; copolymers of acrylonitrile, butadiene, and styrene; copolymers of acrylonitrile and lower methacrylic acid esters; polyvinyl chloride; cellulose acetate-butyrate; and polyvinyl acetate can be mentioned.

The new process can be used to special advantage to form domed bodies from sheets of stretched thermoplastic synthetic resins, that is from resins which have been heated above their softening point, have been mono-axially or bi-axially stretched in this condition, and then have been cooled in the stretched condition below their freezing temperature. Since the restoring forces released in such a sheet by renewed heating tend to permit the sheet to shrink back to its original size before stretching, the forming of such a stretched material requires that the material be tightly held on all its edges during heating and forming. Since doming of the stretched material using the process of the present invention takes place at normal temperatures, i.e. far below the softening point, the sheet of stretched material must only be warmed, as described above, in the region of its edges, which are held under pressure, so that the aforementioned restoring forces do not arise in the largest portion of the sheet.

The process of the invention solves in a simple manner a problem long encountered by those skilled in the art. Heretofore in the preparation of heat-insulating double-walled structures from two sheets of synthetic resin, at least one of the two sheets had to be domed by conventional techniques while in a softened state and then tightly bonded in edge portions with either a second, planar sheet or with a congruently domed piece by adhesion, welding, with the aid of an interposed elastic gasket, or the like. In the preparation of viewing elements, for example of light domes and windows for house trailers, distortion-free optics are necessary. For this reason, expensive resin sheets prepared by in situ polymerization (cast sheets) were principally used as the starting materials for such purposes. Nevertheless, optical disturbances in the finished viewing elements, caused by the heating necessary for forming at least one of the two sheets, could not be completely avoided. However, in double-walled elements prepared by the method of the present invention, the distortion-free optics of the starting materials are completely maintained. In the preparation of such elements, the forming process is carried out in the following manner to particular advantage.

Two sheets, suitably square, which are to be bonded together are placed one above the other and tightly clamped in peripheral portions in an edge zone in the manner described earlier herein. The edge zone is then heated above the softening temperature of the resin by means of the clamping apparatus. In this case also the pressure exerted by the clamping apparatus must be sufficiently high that a temperature-induced change in the linear dimensions cannot take place. For uniform heating of the clamped materials throughout the entire thickness of both sheets, the heating is maintained for a certain time after the desired temperature is reached, for example from 60 – 120 seconds.

It has proved particularly advantageous to form and weld the sheets concurrently, e.g. by the application of a highfrequency field, a process which is commonly used by those skilled in the art for the welding of synthetic resin sheets. After welding is completed, the warmed edge portions are permitted to cool slightly below the freezing temperature and then, as already described, the edge clamping is released.

For the desired doming of the double element on both sides, it is necessary that the pressure between the outer atmosphere and the cavity formed between the two sheets can be equalized. This can be simply accomplished by providing at least one of the sheets with one or more apertures. On cooling of the edge portions, the two sheets dome spherically outward, whereupon air streams into the chamber formed between the two sheets, indeed hissing if there is a rapid cooling and if small openings are present. The apertures which permit pressure equalization are advantageously present before the plates which are to be welded together are put into contact, but nevertheless can be bored at any other convenient time during or after the unclamping of the edge zones.

The method of the invention can be applied to planar resin sheets of any geometric configuration, but the symmetry of the dome obtained depends on the symmetry of the sheet being treated. True hemispherical domes are formed if the planar sheet is circular, and substantially hemispherical domes are formed if the sheet is rectangular, e.g. square, and is clamped and heated on all four edge portions. Cylindrical domes are obtained if such a square or rectangular sheet is clamped and heated on two parallel edges. Similar cylindrically domed bodies are obtained if other nonrectangular polygonal bodies are clamped and heated on two opposing edges parallel to a line of symmetry through the planar sheet, e.g. along two opposing parallel edges of a trapezoid, hexagon, or octagon. More nearly hemispherical bodies are obtained by clamping and heating such polygons on all sides, as is true also of polygons such as triangles or pentagons which do not have two sides parallel to a line of symmetry in the FIGURE.

While those domes formed according to the invention which have a high degree of symmetry may be preferred as roof coverings, skylights, etc., nonetheless the method of the invention is broadly applicable to the doming of planar resin sheets of whatever shape, whether symmetrical or asymmetrical.

What is claimed is:

1. A cold-forming method for doming a planar sheet of a thermoplastic synthetic resin which comprises tightly clamping said sheet along edge portions thereof, heating only the clamped edge portions of the sheet to a temperature above the glass transition temperature of the resin, cooling the heated clamped edge portions slightly below the glass transition temperature of the resin, releasing the clamping, and further cooling the edges to room temperature, whereupon unheated central portions of the planar sheet deform to form a dome.

2. A method as in claim 1 wherein said sheet of thermoplastic synthetic resin is mono-axially or bi-axially stretched prior to cold-forming according to the invention, and is clamped in all edge portions thereof during said cold-forming.

3. A method as in claim 1 wherein said planar sheet is circular and is clamped and heated along its circumference.

4. A method as in claim 1 wherein said planar sheet is a polygon and is clamped and heated along all its edges.

5. A method as in claim 4 wherein said polygon is a rectangle.

6. A method as in claim 4 wherein said polygon is a square.

7. A method as in claim 1 wherein said planar sheet is a polygon having at least two opposing edges parallel to a line of symmetry and is clamped and heated along at least said two opposing edges.

8. A cold-forming method for making a double-walled, domed, structural element which comprises tightly clamping two superimposed thermoplastic synthetic resin sheets along all edge portions thereof, heating only the clamped edge portions of the sheets to a temperature above the glass transition temperature of the resin to weld the sheets together in said edge portions, cooling the heated clamped edge portions slightly below the glass transition temperature of the resin, releasing the clamping, and further cooling the welded edges to room temperature, whereupon unheated central portions of said planar sheets deform to form a double-walled dome, at least one of said sheets having an aperture therein whereby the pressure between the walls of said dome and ambient pressure are equalized.

9. A method as in claim 2 wherein said superimposed synthetic resin sheets are circular.

10. A method as in claim 2 wherein said superimposed synthetic resin sheets are square.

* * * * *